Figure 5:
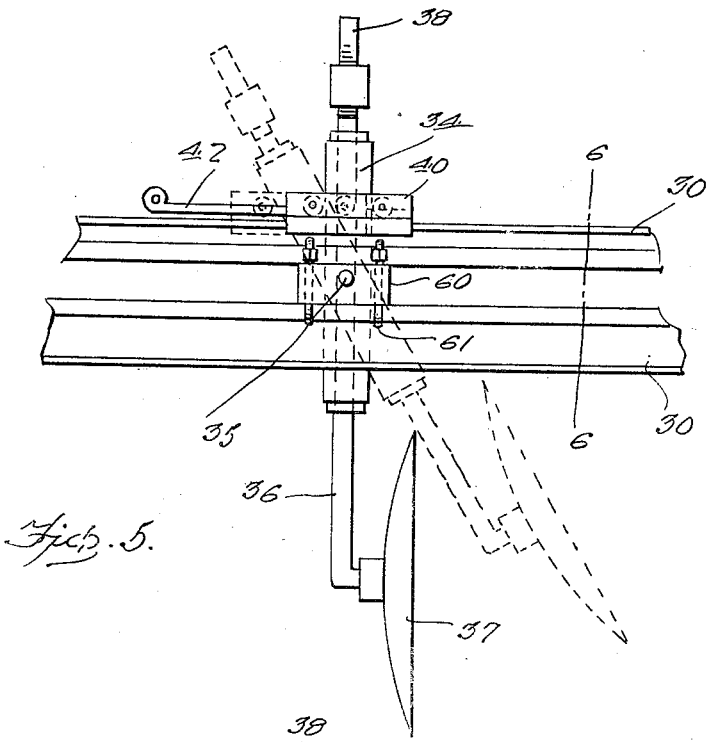

Sept. 3, 1929.  H. B. KNOBBE  1,726,842
DISK FARMING APPARATUS
Filed Feb. 10, 1928   3 Sheets-Sheet 1
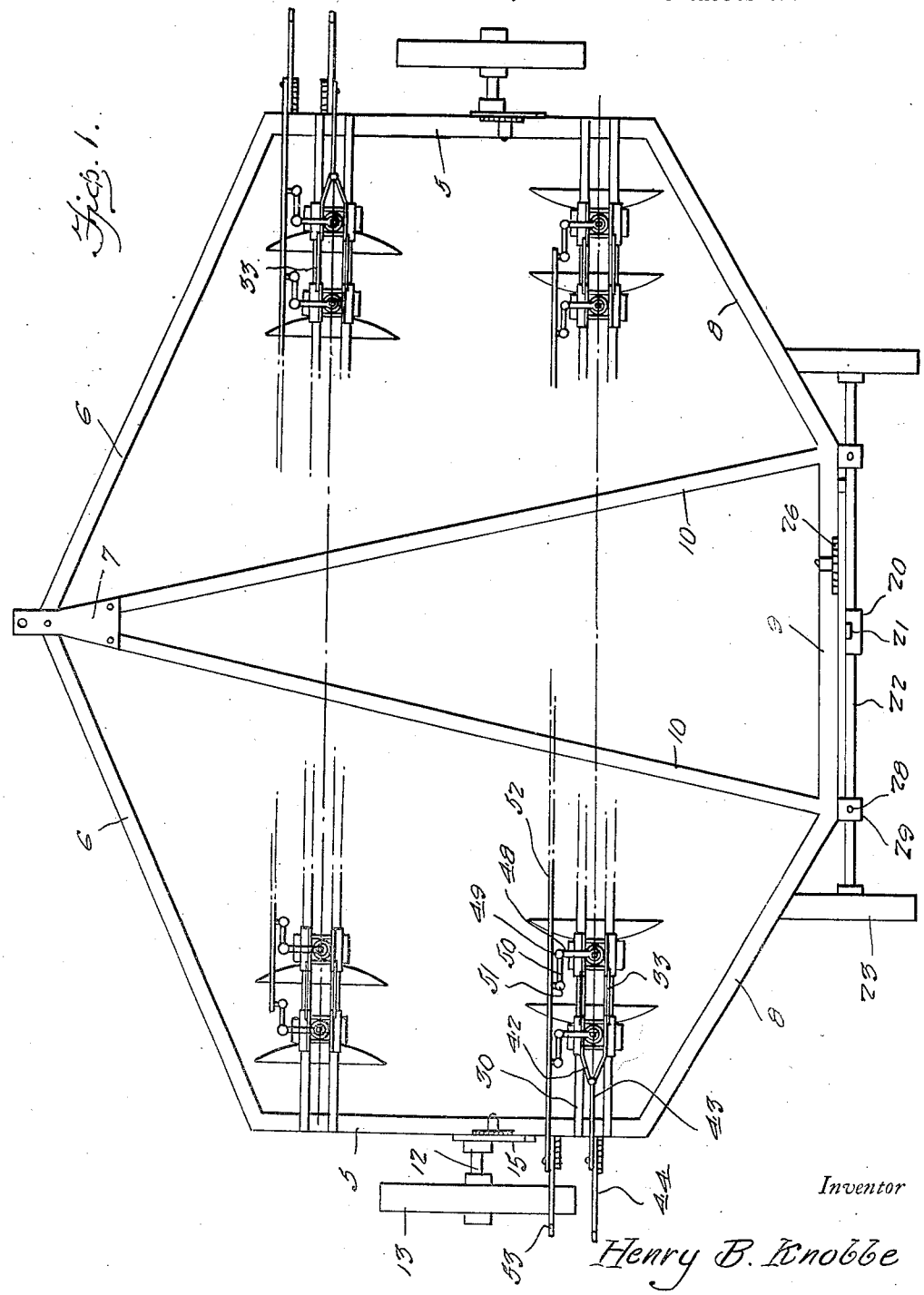
Inventor
Henry B. Knobbe
By Clarence A. O'Brien
Attorney

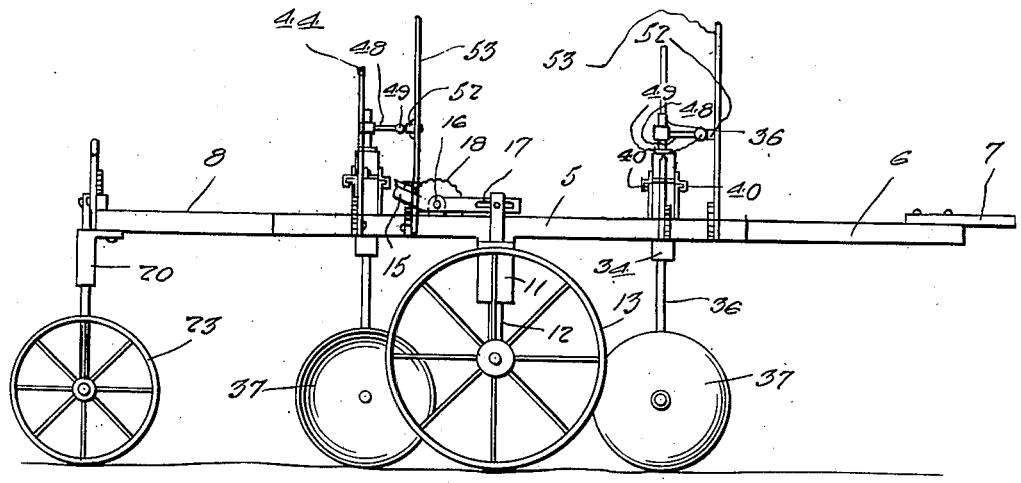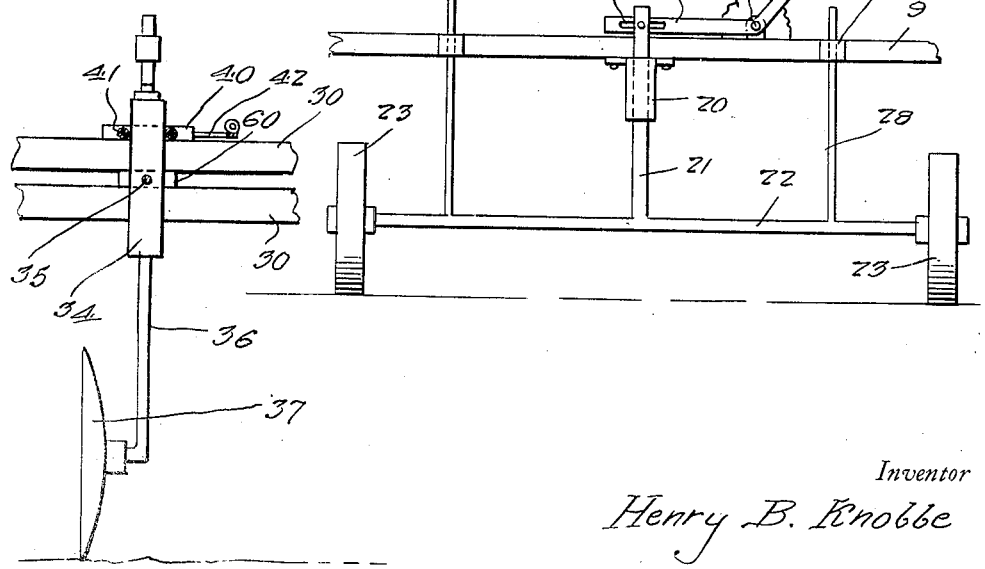

Sept. 3, 1929.                H. B. KNOBBE                1,726,842
                         DISK FARMING APPARATUS
                   Filed Feb. 10, 1928        3 Sheets-Sheet 3

Inventor
Henry B. Knobbe
By Clarence A. O'Brien
Attorney

Patented Sept. 3, 1929.

1,726,842

UNITED STATES PATENT OFFICE.

HENRY B. KNOBBE, OF SPEARVILLE, KANSAS.

DISK-FARMING APPARATUS.

Application filed February 10, 1928. Serial No. 253,347.

The present invention relates to a disk farming apparatus and has for its principal object to provide a plurality of front disks constructed to turn the soil in one direction and a plurality of rear disks constructed to turn the soil in the opposite direction, and means for simultaneously adjusting the front disk and simultaneously adjusting the rear disks to change the direction of their operation and their angles in respect to the ground.

Another very important object of the invention resides in the provision of an apparatus of this nature which is particularly useful to the wheat farmers in that it is constructed to kill the weeds at the desired depth below the ground and to leave the ground in proper condition.

A still further very important object of the invention resides in the provision of an apparatus of this nature which is comparatively simple in its construction, strong and durable, easy and convenient to manipulate, adjust and handle, thoroughly efficient and reliable in its operation, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

Figure 6:
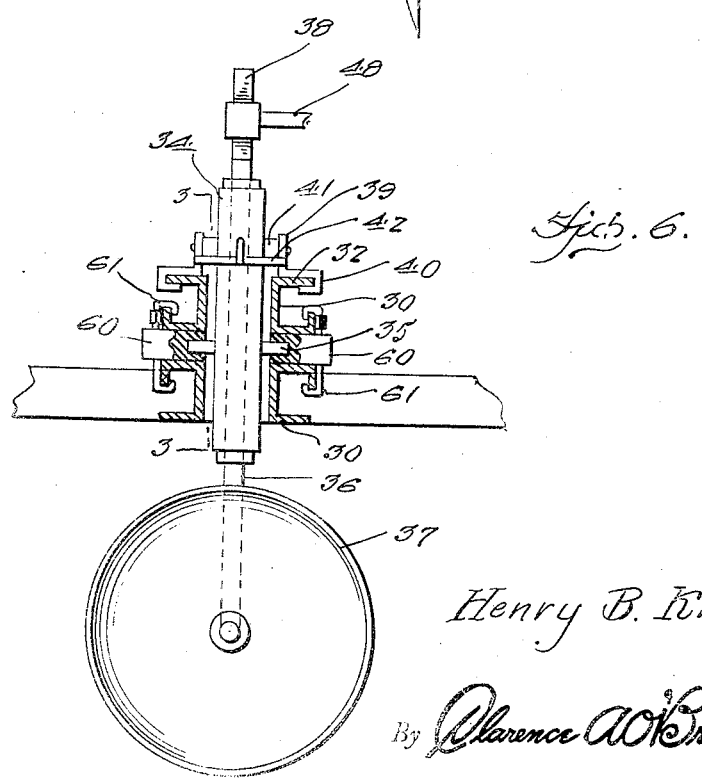

In the drawing:

Figure 1 is a top plan view of the apparatus embodying the features of my invention, Figure 2 is a side elevational view thereof, Figure 3 is a detail vertical section taken substantially on the line 3—3 of Figure 6, Figure 4 is a fragmentary rear elevation of the apparatus, Figure 5 is an enlarged detail side elevation of one of the implements with the supporting and adjusting mechanism associated therewith, and Figure 6 is a vertical section taken substantially on the line 6—6 of Figure 5.

Referring to the drawing in detail it will be seen that the main frame comprises side members 5 disposed in spaced parallel coextensive relationship and have merging from their forward ends front members 6 which diverge inwardly and forwardly to meet in a bracket 7. The rear ends of the side members 5 merge into rearwardly and inwardly diverging members 8 which terminate in a rear transverse member 9. Braces 10 extend from the junctures of the members 8 with the member 9 to the bracket 7. Bearing brackets 11 depend from the side members 5 and slidably receive the longer vertical portions of L-shaped axles 11, the shorter horizontal portions thereof having journaled thereon wheels 13. One lever 15 is pivotally mounted intermediate its ends as at 16 on each member 5 and has a pin and slot connection 17 with the corresponding axle 12. A notched segment 18 is disposed adjacent each lever 15 and a detent structure (not shown) is provided on the lever for engaging the segment 18 so that the lever may be held in different adjusted positions after having been swung to raise or lower the frame as will be quite apparent.

A bearing bracket 20 extends from the rear member 9 and slidably receives a vertical bar 21 rising from a transverse axle 22 with wheels 23 journalled on the ends thereof. A lever 24 is pivotally mounted as at 25 intermediate its ends on the rear member 9 and has a detent structure 25' cooperable with a notched segment 26 so that the lever 24 may be rocked and through its pin and slot connection 27 with the upper end of the bar 21, the rear end of the frame may be raised and lowered and held in desired adjusted position. In order to steady the rear axle 22, rods 28 rise therefrom through brackets 29 on the frame member 9. If desired a front wheel truck may be mounted under the front portion of the main frame.

A forward and a rear row of disk farming implements are disposed below the frame and are practically identical in construction except as will be hereinafter specifically noted. For the purpose of simplicity one row of the mechanisms will be described in detail. The numerals 30 denote four cross bars mounted on the side members 5 to extend therebetween in spaced parallelism to provide an upper pair and a lower pair. A plurality of sleeves 34 are provided intermediate their ends with oppositely disposed trunnions 35 rockably supported in boxings 60 slidable between the upper and lower pairs of cross bars 30. Shanks 36 are rotatably mounted in the sleeves 34 and have disks 37 journaled at their lower ends, said lower ends being transversely extended. The upper ends of the shanks 36 are squared or non-circular in cross section as specifically indicated at 38. A plurality of frames 39 are disposed about the sleeve 34 and include clips 40 slidably engaged with the flanges 32 on the upper edges of the upper pair of bars 30. Frames 39 further include anti-friction rotatable members 41 between the clips 40 to engage the sleeves 34, said members 41 being mounted with their axis in parallelism with the trunnions 35. An arm 42 projects from one end frame of each series transversely of the apparatus toward the adjacent side member of the main frame. Links 33 connect the remaining frames in the series. Rods 43 are engaged with the arms 42 and with levers 44 on the sides of the main frame so that the shanks 36 and disks 37 may be rocked transversely of the main frame by sliding the frame 39 along the upper pairs of bars 30. One lever 44 is on one side member of the main frame and the other lever on the other side member of the main frame.

Cranks 48 are disposed on the non-circular upper ends of the shanks 36 and have universal connection 49 with links 50 which in turn have universal connection 51 with transversely extending rods 52. These rods 52 are engaged with levers 53 rockable on the side members 5 to swing in planes parallel to the planes in which the levers 44 rock. It will, therefore, be seen that by rocking the levers 44 the shanks may be rotated in the sleeves 34 to change the angles of the disks to the line of travel of the apparatus.

The boxings are held in adjusted positions in relation to the bars 30 by suitable clamps 61 and these boxings may thus be spaced apart any desired distance.

From the above detailed description it will be seen that I have provided a combination of cooperative instrumentalities which enable the operator of the apparatus to simultaneously rotate the shanks of the rows of disks and to rock said shanks in vertical planes extending transversely of the path of movement of the apparatus. It will also be seen that I have devised cooperative instrumentalities which enable the operator to adjust the frame in respect to the ground to vary the distance therebetween and to vary the angularities therebetween. It will be readily apparent that these two sets of cooperant instrumentalities functionally cooperate to vary the digging depth of the disks and to adjust the disks to conform to the lay of the ground.

It is thought that the construction, operation and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It is apparent, therefore, that changes in the details of construction, and in the combination and arrangement of parts may be resorted to without departing from the spirit or scope of the invention as hereinafter claimed or sacrificing any of its advantages.

Having thus described my invention, what I claim as new is:

1. In a disk farming apparatus of the class described, a wheeled frame, means for varying the height of the frame from the ground and its angularity thereto, a plurality of disks, a plurality of shanks on which the disks are rotatably mounted, means for supporting the shanks in the frame, means for rotating the shanks and means to rock the shanks in vertical planes transversely of the wheeled frame.

2. In a disks farming implement of the class described, a frame, a supporting structure in the frame, a sleeve, means for rockably mounting the sleeve in the supporting structure on an axis transverse to the bore of the sleeve, a member slidable on the supporting structure, said sleeve extending through the member, means for moving the member to rock the sleeve on said axis, a shank rotatable in the sleeve, and means for rocking the shank in the sleeve.

In testimony whereof I affix my signature.

HENRY B. KNOBBE.